United States Patent
Kim et al.

(10) Patent No.: US 10,700,331 B2
(45) Date of Patent: Jun. 30, 2020

(54) SEPARATOR FOR RECHARGEABLE LITHIUM BATTERY

(71) Applicants: SAMSUNG SDI CO., LTD., Yongin-si, Gyeonggi-do (KR); ROBERT BOSCH GMBH, Stuttgart (DE)

(72) Inventors: In Kim, Yongin-si (KR); Hyung-Sik Kim, Yongin-si (KR); Duk-Jung Kim, Yongin-si (KR); Zin Park, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 465 days.

(21) Appl. No.: 13/907,822

(22) Filed: May 31, 2013

(65) Prior Publication Data
US 2014/0057155 A1  Feb. 27, 2014

(30) Foreign Application Priority Data
Aug. 23, 2012 (KR) .................. 10-2012-0092567

(51) Int. Cl.
| | | |
|---|---|---|
| H01M 2/16 | (2006.01) | |
| H01M 10/0568 | (2010.01) | |
| H01M 10/052 | (2010.01) | |
| H01M 10/0569 | (2010.01) | |
| H01M 10/0565 | (2010.01) | |

(52) U.S. Cl.
CPC ....... *H01M 2/1686* (2013.01); *H01M 2/1653* (2013.01); *H01M 10/052* (2013.01); *H01M 10/0565* (2013.01); *H01M 10/0568* (2013.01); *H01M 10/0569* (2013.01); *H01M 2300/0085* (2013.01)

(58) Field of Classification Search
CPC . H01M 10/0565; H01M 2/168; H01M 2/1686
See application file for complete search history.

(56) References Cited

U.S. PATENT DOCUMENTS

| | | | |
|---|---|---|---|
| 5,296,318 A | * | 3/1994 | Gozdz et al. ................. 429/316 |
| 5,665,265 A | * | 9/1997 | Gies et al. ................... 252/62.2 |
| 6,280,881 B1 | * | 8/2001 | Wendsjo ............. H01M 10/052 |
| | | | 29/623.1 |

(Continued)

FOREIGN PATENT DOCUMENTS

| | | |
|---|---|---|
| EP | 1 482 578 A1 | 12/2004 |
| KR | 10-1999-0047119 A | 10/1999 |

(Continued)

OTHER PUBLICATIONS

P. Arora and Z. Zhang, "Battery Separators," Chem. Rev., 104 (10), 4424-4427, 4436-4442 (2004).*

(Continued)

*Primary Examiner* — Jimmy Vo
(74) *Attorney, Agent, or Firm* — Lewis Roca Rothgerber Christie LLP

(57) ABSTRACT

A separator for a rechargeable lithium battery includes a backbone polymer, an ion conductive polymer coating the backbone polymer, and an electrolyte solution immersing the backbone polymer, wherein the backbone polymer and the ion conductive polymer are different from each other.

12 Claims, 5 Drawing Sheets

(56) References Cited

U.S. PATENT DOCUMENTS

| | | | |
|---|---|---|---|
| 6,291,106 B1* | 9/2001 | Daido | H01M 2/16 429/231.8 |
| 6,692,873 B1 | 2/2004 | Park et al. | |
| 6,881,515 B2* | 4/2005 | Wensley | 429/145 |
| 6,949,318 B2 | 9/2005 | Choi et al. | |
| 2002/0187401 A1* | 12/2002 | Lee et al. | 429/303 |
| 2003/0114614 A1 | 6/2003 | Wille et al. | |
| 2003/0180623 A1* | 9/2003 | Yun et al. | 429/309 |
| 2004/0241550 A1 | 12/2004 | Wensley et al. | |
| 2005/0005431 A1* | 1/2005 | Koo et al. | 29/623.2 |
| 2012/0309860 A1* | 12/2012 | Huang | H01M 2/145 521/134 |

FOREIGN PATENT DOCUMENTS

| | | | |
|---|---|---|---|
| KR | 10-1999-0004435 A | | 9/2000 |
| KR | 10-2000-0055681 | | 9/2000 |
| KR | 2002-0071203 | | 9/2002 |
| KR | 2002-0083117 A | | 11/2002 |
| KR | 10-0407485 B1 | | 11/2003 |
| KR | 10-0456648 B1 | | 11/2004 |
| KR | 10-2004-0103310 | | 12/2004 |
| WO | WO 02/061874 A1 | | 8/2002 |
| WO | WO 02061872 A1 * | | 8/2002 |

OTHER PUBLICATIONS

Puetz J, Aegerter MA (2004) Dip coating technique, sol-gel technologies for glasses producers and users. Springer, New York, pp. 37-48.*

Korean Patent Abstracts, Publication No. 10-2000-0055681 A, dated Sep. 15, 2000, for corresponding Korean Patent No. 10-1999-0004435 A, 2 pages.

Ichino, Toshihiro, Dual-phase polymer electrolyte prepared from polar and non-polar latices, journal, Colloids and Surfaces, 153, (1999), pp. 567-574.

Lee, Sang-Young, et al., Phase Behavior of Gel-Type Polymer Electrolytes and its Influence on Electrochemical Properties, journal, ChemPhysChem 6, (2005), pp. 49-53.

Magistris, A. et al., PVDF-based porous polymer electrolytes for lithium batteries, journal, Solid State Ionics 152, (2002), pp. 347-354.

Saikia, D., et al., Ionic conduction in P(VDF-HFP)/PVDF-(PC+DEC)-LiClO4 polymer gel electrolytes, journal, Electrochimica Acta 49, (2004), pp. 2581-2589.

Song, J. M. et al., Electrochemical characteristics of phase-separated polymer electrolyte based on poly vinylidence fluoride-co-hexafluoropropane) and ethylene carbonate, journal, Electrochimica Acta 48, (2003), pp. 1339-1346.

Stephan, A. Manuel et al., Cycling behavior of poly (vinylidence fluoride-hexafluoropropylene) (PVdF-HFP) membranes prepared by phase inversion method, journal, Materials Chemistry and Physics 85, (2004), pp. 6-11.

Stephan, A. Manuel et al., Characterization of poly (vinylidence fluoride-hexafluoropropylene) (PVdF-HFP) electrolytes complexed with different lithium salts, journal, European Polymer Journal 41, (2005), pp. 15-21.

Korean Patent Abstracts for Korean Publication 1020020083117 dated Nov. 1, 2002, corresponding to Korean Patent 10-0407485 listed above, dated Nov. 28, 2003, (2 pages).

Korean Patent Abstracts for Korean Publication 1020010038935 dated May 15, 2001, corresponding to Korean Patent 10-0456648 listed above, dated Nov. 10, 2004, (2 pages).

Extended European Search Report, dated Oct. 14, 2013, for Application No. 13180962.6, 6 pages.

KIPO Office action dated Apr. 26, 2016, for Korean priority Patent application 10-2012-0092567, (4 pages).

* cited by examiner

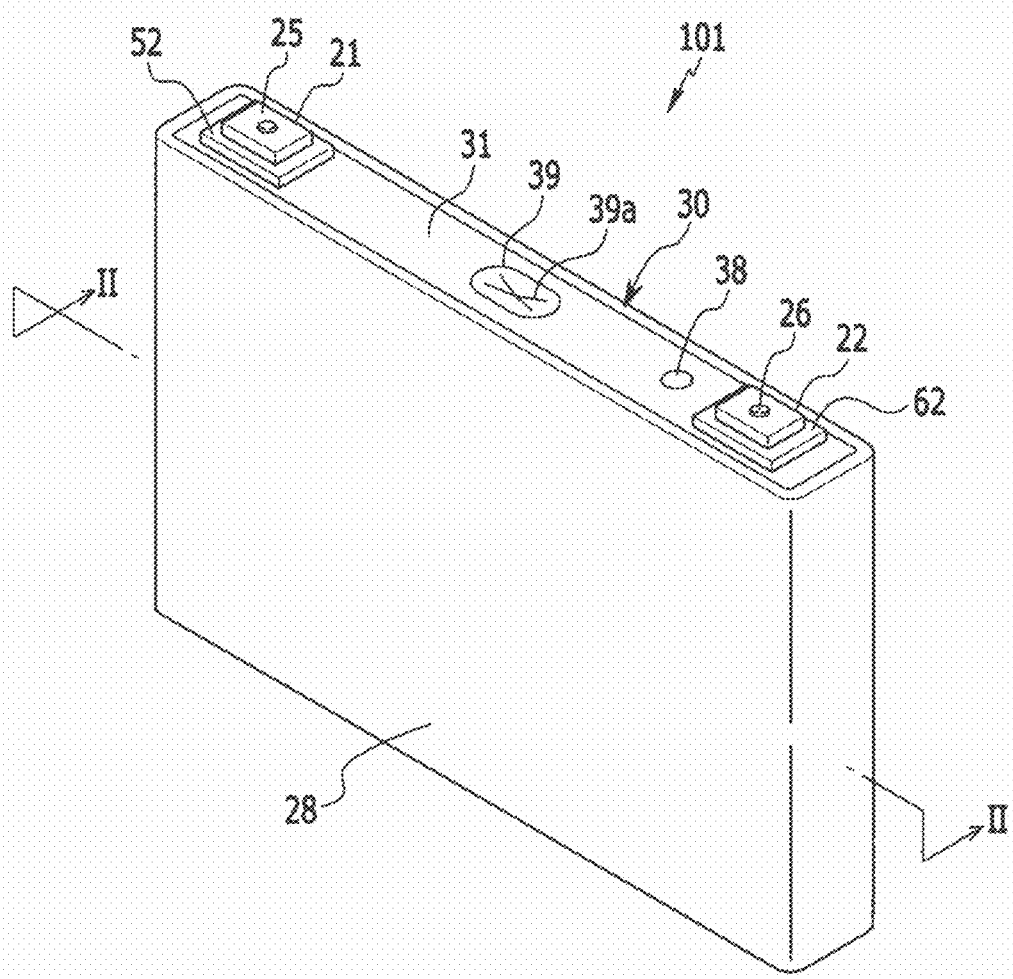

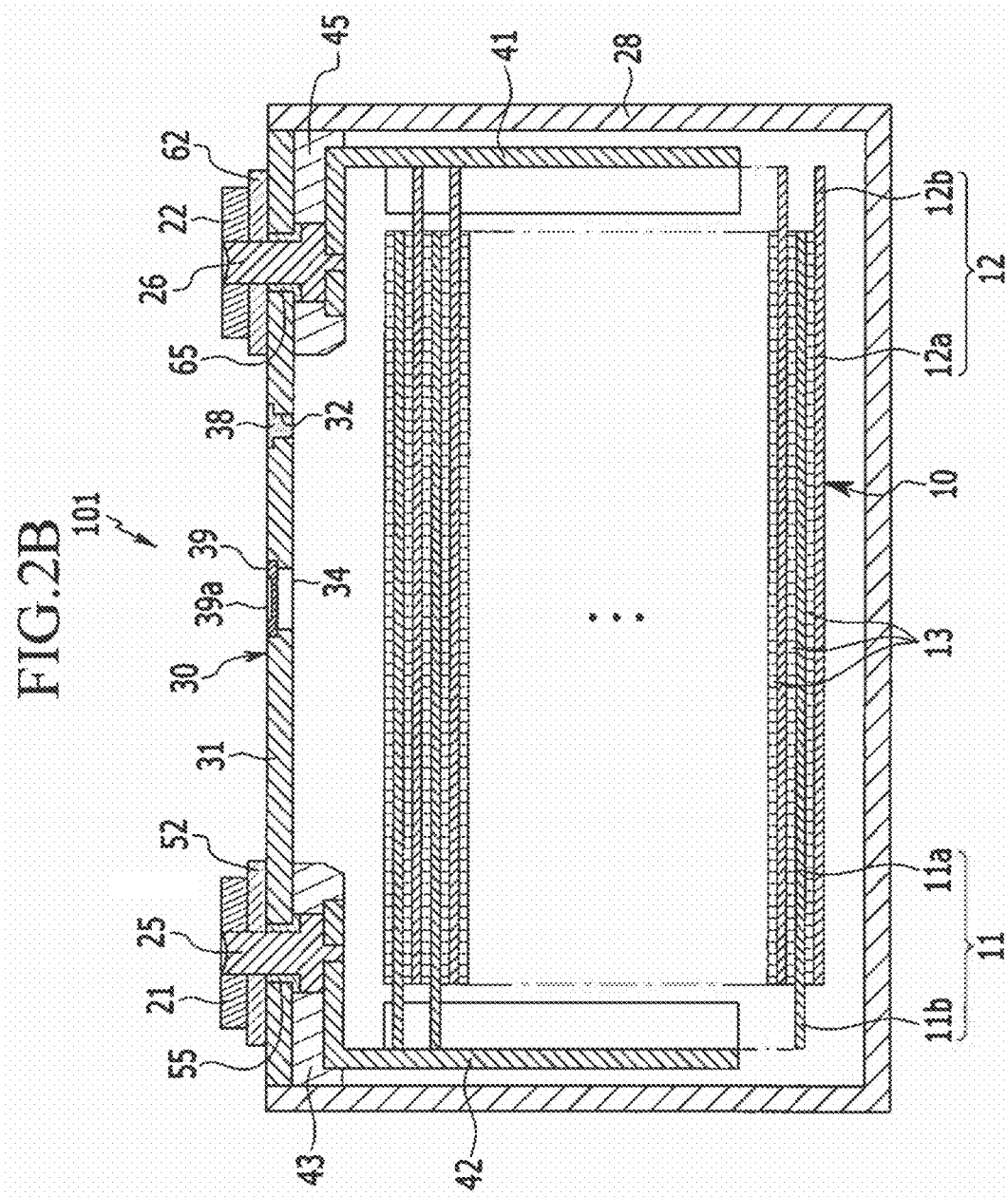

SEPARATOR FOR RECHARGEABLE LITHIUM BATTERY

CROSS-REFERENCE TO RELATED APPLICATION

This application claims priority to and the benefit of Korean Patent Application No. 10-2012-0092567, filed in the Korean Intellectual Property Office on Aug. 23, 2012, the entire contents of which are incorporated herein by reference.

BACKGROUND

1. Field

This disclosure relates to a separator for a rechargeable lithium battery.

2. Description of the Related Art

Rechargeable lithium batteries have recently drawn attention as a power source for small portable electronic devices. They use an organic electrolyte and thereby have at least twice the discharge voltage compared to a conventional battery using an alkali aqueous solution, and accordingly they have high energy density.

A rechargeable lithium battery includes an electrode assembly including a positive electrode, a negative electrode, a separator between the positive electrode and the negative electrode, and an electrolyte, in which the positive electrode, the negative electrode, and the separator are immersed.

As the separator should have high mechanical strength, it may have other limitations. For example, a separator made of a polyvinylidenefluoride polymer has high mechanical strength, but it has lower ion conductivity.

SUMMARY

Aspects of embodiments of the present invention are directed to a separator for a rechargeable lithium battery having good mechanical strength and good ionic conductivity.

According to some embodiments of the present invention, a separator for a rechargeable lithium battery includes a backbone polymer, and an ion conductive polymer coating the backbone polymer, and an electrolyte solution immersed into the backbone polymer and the ion conductive polymer, wherein the backbone polymer and the ion conductive polymer are different from each other.

The backbone polymer may include at least one selected from polyvinylidenefluoride (PVdF), polytetrafluoroethylene (PTFE), polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC).

The ion conductive polymer may include at least one selected from a copolymer of polyvinylidenefluoride and hexafluoropropylene (PVdF-HFP), polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC).

The backbone polymer may include polyvinylidenefluoride (PVdF), and the ion conductive polymer may include a copolymer of polyvinylidenefluoride and hexafluoropropylene (PVdF-HFP).

The PVdF-HFP may include hexafluoropropylene (HFP) in an amount of about 2 wt % to about 70 wt % based on the total weight of the PVdF-HFP. In some embodiments, the PVdF-HFP may include HFP in an amount of about 5 wt % to about 15 wt % based on the total weight of the PVdF-HFP.

The electrolyte solution may include a lithium salt and a non-aqueous organic solvent.

The lithium salt may include $LiClO_4$, and the non-aqueous organic solvent may include a mixture of propylenecarbonate (PC) and ethylenecarbonate (EC).

The backbone polymer may be included in an amount of about 5 wt % to 90 wt % based on the total weight of the separator.

The ion conductive polymer may be included in an amount of about 5 wt % to 90 wt % based on the total weight of the separator.

The electrolyte solution may be included in an amount of about 5 wt % to 90 wt % based on the total weight of the separator.

The ion conductive polymer and the electrolyte solution may be included in a weight ratio of about 1:9 to 9:1. In some embodiments, the ion conductive polymer and the electrolyte solution may be included in a weight ratio of about 1:2 to 1:9.

The backbone polymer may be a film.

Other embodiments of the present invention are described in the following detailed description.

The separator may be used in a rechargeable lithium battery to provide improved battery performance as a result of good mechanical strength and good ionic conductivity.

BRIEF DESCRIPTION OF THE DRAWINGS

FIG. 2A is a perspective view of a rechargeable lithium battery according to one embodiment and FIG. 2B is a cross-sectional view taken along the line II-II of FIG. 2A.

DETAILED DESCRIPTION

Exemplary embodiments of this disclosure will hereinafter be described in detail. However, these embodiments are only exemplary, and this disclosure is not limited thereto.

According to one embodiment of the present invention, a separator for a rechargeable lithium battery may include a backbone polymer, an ion conductive polymer (e.g., an ionic conductive polymer), and an electrolyte solution.

Since the backbone polymer and the ion conductive polymer are different from each other, the separator has a dual-phase (e.g., double-phase) structure including these polymers.

Figure 1:
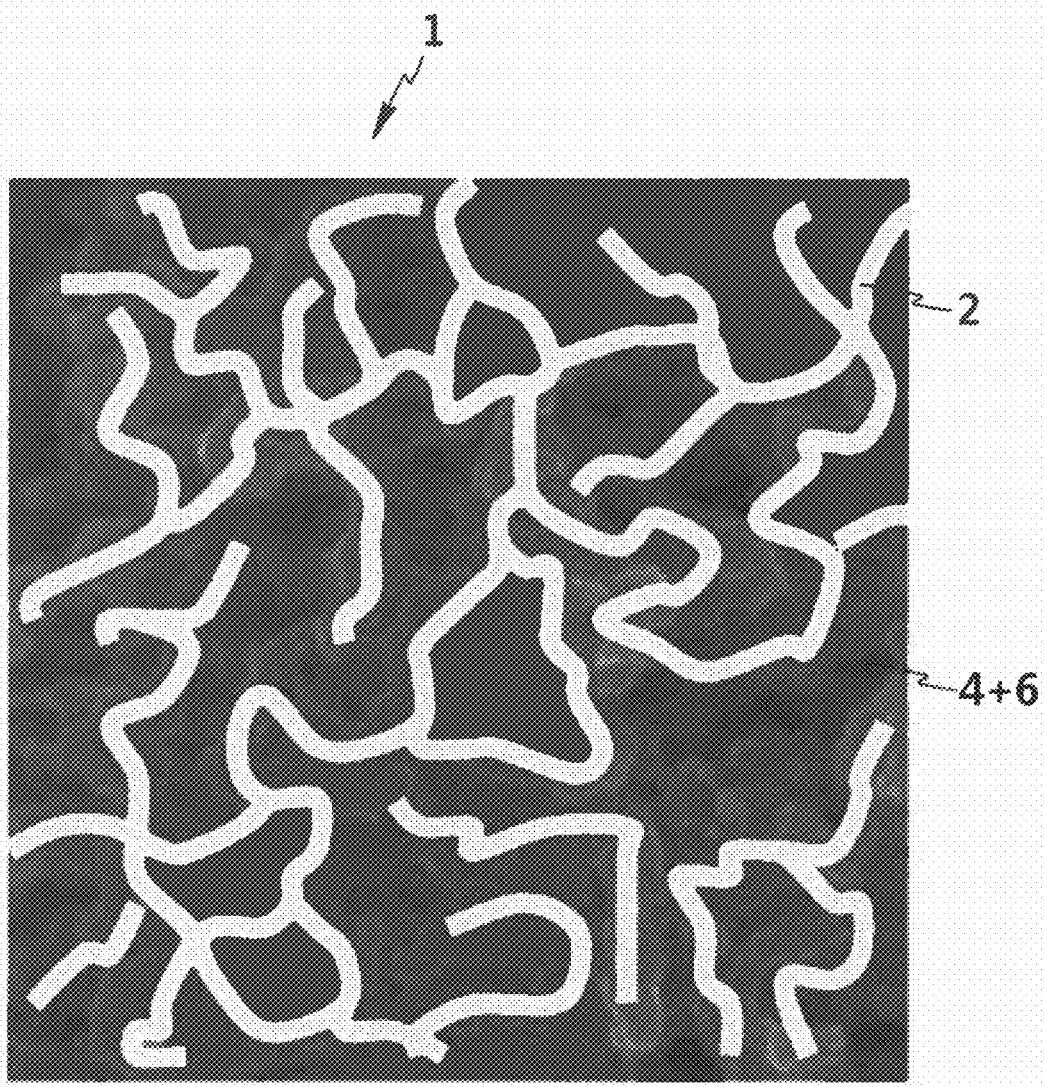
FIG. 1 is a schematic view depicting a dual-phase structure of a separator for a rechargeable lithium battery according to one embodiment.

The dual-phase structure is illustrated referring to FIG. 1.

FIG. 1 is a schematic view showing the dual-phase structure of the separator for a rechargeable lithium battery according to embodiments of the present invention.

Referring to FIG. 1, the separator 1 includes a backbone polymer 2, an ion conductive polymer 4 coating (e.g., surrounding) the backbone polymer 2, and an electrolyte solution 6 coating (e.g., surrounding or immersing) the backbone polymer 2. Herein, the ion conductive polymer 4 and the electrolyte solution 6 are mixed together and coat the backbone polymer 2, and the electrolyte solution 6 is immersed into the ion conducive polymer 4. In this way, the separator has a dual-phase structure of the backbone polymer coated with the ion conductive polymer.

The backbone polymer may have high mechanical strength and high crystallinity. In some embodiments, the backbone polymer is a sheet or film. In some embodiments, the backbone polymer may be at least one selected from polyvinylidenefluoride (PVdF), polytetrafluoroethylene (PTFE), polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC). In some embodiments, the backbone polymer is polyvinylidenefluoride (PVdF).

The backbone polymer may have a weight average molecular weight ranging from about 20,000 g/mol to about 50,000,000 g/mol.

The ion conductive polymer may be a gel-type polymer having high ionic conductivity, and may be at least one selected from a copolymer of polyvinylidenefluoride and hexafluoropropylene (PVdF-HFP), polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC). In some embodiments, the ion conductive polymer is a copolymer of polyvinylidenefluoride and hexafluoropropylene (PVdF-HFP).

The ion conductive polymer may have a weight average molecular weight of about 20,000 g/mol to about 50,000,000 g/mol.

The ion conductive polymer may be used to adjust the size of an amorphous domain that provides a path for lithium ions. Accordingly, the separator may retain an electrolyte solution in a large amount and thus, have high ionic conductivity.

The copolymer of polyvinylidenefluoride and hexafluoropropylene (PVdF-HFP) may include hexafluoropropylene (HFP) in an amount of about 2 wt % to about 70 wt % based on the total weight of the copolymer. In some embodiments, the PVdF-HFP may include HFP in an amount of about 2 wt % to about 50 wt % based on the total weight of the polymer. In some embodiments, the HFP may be included in an amount of about 2 wt % to about 30 wt % based on the total weight of the polymer, and in some embodiments, the HFP may be included in an amount of about 5 wt % to about 15 wt % based on the total weight of the polymer. In some embodiments, when the hexafluoropropylene (HFP) is included within the above described range, the separator has high ionic conductivity.

The backbone polymer may have excellent mechanical strength but low ionic conductivity. However, when the backbone polymer is coated with the ion conductive polymer having high ionic conductivity, the separator may have good mechanical strength and good ionic conductivity. In other words, because the backbone polymer may play a role of a backbone providing mechanical strength, and because the ion conductive polymer coating the backbone polymer provides a path for lithium ions for ionic conductivity, the dual-phase separator may have both good mechanical strength and high ion conductivity. Accordingly, the separator may improve or maximize performance of a rechargeable lithium battery.

The backbone polymer may be included in an amount of about 5 wt % to about 90 wt % based on the total weight of the separator. In some embodiments, the backbone polymer may be included in an amount of about 30 wt % to about 70 wt % based on the total weight of the separator. In some embodiments, when the backbone polymer is included within the above described range, the separator may have good mechanical strength.

The ion conductive polymer may be included in an amount of about 5 wt % to about 90 wt % based on the total weight of the separator. In some embodiments, the ion conductive polymer may be included at about 30 wt % to about 70 wt % based on the total weight of the separator. In some embodiments, when the ion conductive polymer is included within the above described range, the separator may have good ionic conductivity.

The electrolyte solution may include a lithium salt and a non-aqueous organic solvent.

The lithium salt is dissolved in the non-aqueous solvent and supplies lithium ions in a rechargeable lithium battery, and improves lithium ion transfer between positive and negative electrodes.

The lithium salt may include $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and/or $LiB(C_2O_4)_2$ (lithium bis(oxalato) borate, LiBOB). In some embodiments, the lithium salt may include $LiClO_4$.

The concentration of the lithium salt may be in a range of about 0.1M to about 2.0 M. In some embodiments, when the lithium salt is included in the above concentration range, the electrolyte has a suitable conductivity and viscosity, thereby exhibiting good electrolyte performance and effectively transferring lithium ions.

The non-aqueous organic solvent acts as a medium for transmitting ions taking part in the electrochemical reaction of the battery. The non-aqueous organic solvent may include at least one selected from a carbonate-based solvent, an ester-based solvent, an ether-based solvent, a ketone-based solvent, an alcohol-based solvent, and an aprotic solvent.

The carbonate-based solvent may include, for example, dimethyl carbonate (DMC), diethyl carbonate (DEC), dipropyl carbonate (DPC), methylpropyl carbonate (MPC), ethylpropyl carbonate (EPC), methylethyl carbonate (MEC), ethylmethyl carbonate (EMC), ethylene carbonate (EC), propylene carbonate (PC), butylene carbonate (BC), and/or the like. In some embodiments, the ethylene carbonate, the propylene carbonate, or a mixture thereof may be used.

When the carbonate-based solvent is prepared by mixing a cyclic carbonate and a linear carbonate, a solvent having a low viscosity while having an increased dielectric constant may be obtained. When a mixture is used, the cyclic carbonate compound and linear carbonate compound may be mixed together at a volume ratio of about 1:1 to about 1:9.

The ester-based solvent may include, for example, methyl acetate, ethyl acetate, n-propyl acetate, dimethyl acetate, methyl propionate, ethyl propionate, γ-butyrolactone, decanolide, valerolactone, mevalonolactone, caprolactone, and/or the like.

The ether-based solvent may include, for example, dibutylether, tetraglyme, diglyme, dimethoxyethane, 2-methyltetrahydrofuran, tetrahydrofuran, and/or the like.

The ketone-based solvent may include cyclohexanone and/or the like.

The alcohol-based compound may include ethanol, isopropyl alcohol, and/or the like.

The non-aqueous organic solvent may be used singularly or in a mixture. When the organic solvent is used in a mixture, the mixture ratio may be controlled in accordance with a desired battery performance.

The electrolyte solution may be included in an amount of about 5 wt % to about 90 wt % based on the total weight of the separator. In some embodiments, the electrolyte solution may be included in an amount of about 50 wt % to about 85 wt % based on the total weight of the separator. In some embodiments, when the electrolyte solution is included within the above described range, ionic conductivity is increased.

The ion conductive polymer and the electrolyte solution may be included in a weight ratio of about 1:9 to about 9:1. In some embodiments, the ion conductive polymer and the electrolyte solution may be included in a weight ratio of about 1:2 to about 1:9, and in some embodiments, the ion conductive polymer and the electrolyte solution may be included in a weight ratio of about 1:2 to about 1:6. In some embodiments, when the ion conductive polymer and the electrolyte solution are used within the above ratio, ionic conductivity is increased.

The separator may be fabricated in the following method.

The ion conductive polymer, the electrolyte solution, and a solvent are mixed together. Herein, the ion conductive polymer and the electrolyte solution may be mixed in a weight ratio of about 1:9 to about 9:1. In some embodiments, the ion conductive polymer and the electrolyte solution are mixed in a weight ratio of about 1:2 to about 1:9, and in some embodiments, the ion conductive polymer and the electrolyte solution are mixed in a weight ratio of about 1:2 to about 1:6. The solvent may be included in an amount of about 10 parts by weight to about 90 parts by weight based on 100 parts by weight of the electrolyte solution. Herein, the mixing may be performed at a temperature in a range of about 1° C. to about 90° C. In some embodiments, the mixing is performed at a temperature in a range of about 1° C. to about 50° C. Then, the backbone polymer (which, as described above, may be a sheet or a film) is dipped in the mixture. The coated backbone polymer may then be dried to evaporate the solvent to fabricate a separator. The solvent may be acetone, but the present invention is not limited thereto.

The separator may have a dual-phase structure, that is, a structure of the backbone polymer coated with the ion conductive polymer and the electrolyte solution.

The separator may be used in a rechargeable lithium battery, for example, a lithium ion polymer battery including a polymer electrolyte instead of a liquid electrolyte solution.

An exemplary embodiment of the rechargeable lithium battery is illustrated in FIGS. 2A and 2B.

FIG. 2A is a perspective view depicting a rechargeable lithium battery according to one embodiment of the present invention, and FIG. 2B is a cross-sectional view showing the cross-section of the rechargeable lithium battery taken along with the line II-II of FIG. 2A.

Referring to FIGS. 2A and 2B, the rechargeable lithium battery 101 according to one embodiment of the present invention includes an electrode assembly 10 fabricated by spirally winding a positive electrode 11 and a negative electrode 12, with a separator 13 interposed therebetween, a case 28 housing the electrode assembly 10, and a cap assembly 30 connected to the opening of the case 28.

The rechargeable lithium battery is illustrated as an example having a prismatic shape. However, the present invention is not limited thereto, and the rechargeable lithium battery may be applied to various batteries such as a lithium polymer battery, a cylindrical battery, and the like.

The case 28 is cuboid and has an opening on one side. The case 28 may be made of aluminum, stainless steel, or the like.

The cap assembly 30 includes a cap plate 31 covering the opening of the case 28, a positive terminal 21 protruding out of the cap plate 31 and electrically connected to the positive electrode 11, and a negative terminal 22 protruding out of the cap plate 31 and electrically connected to the negative electrode 12.

The cap plate 31 has an elongated rectangular shape and is combined with the opening of the case 28. The cap plate 31 is made of a metal such as aluminum or the like. The cap plate 31 includes a sealing cap 38 in (e.g., mounted in) an electrolyte injection opening 32, and a vent hole 34 covered with a vent member 39 having a notch 39a designed (or configured) to be opened under a predetermined (or set) pressure.

The positive terminal 21 and the negative terminal 22 protrude out of the top of the cap plate 31. The positive terminal 21 is electrically connected to the positive electrode 11 through a positive current collecting tab 42, and the negative terminal 22 is electrically connected to the negative electrode 12 through a negative electrode current collecting tab 41.

In addition, a positive terminal connecting member 25 is disposed between the positive terminal 21 and the positive current collecting tab 42 to electrically connect them. The positive terminal connecting member 25 is inserted into a hole in the positive terminal 21. The top of the positive terminal connecting member 25 is fixed and welded to the positive terminal 21, while the bottom thereof is fixed and welded to the positive current collecting tab 42.

In addition, a gasket 55 for sealing is inserted in the hole through which the positive terminal connecting member 25 penetrates the cap plate 31, and is between the positive terminal connecting member 25 and the cap plate 31. The bottom of the positive terminal connecting member 25 is inserted into a lower insulating member 43, which is mounted beneath the cap plate 31, and insulates the positive terminal connecting member 25 and the positive electrode current collecting tab 42 from the cap plate 31.

Furthermore, an upper insulating member 52 is mounted beneath the positive terminal 21 and above the cap plate 31 to electrically insulate them from each other. The positive terminal connecting member 25 is inserted into the upper insulating member 52.

Similarly, a terminal connecting member 26 is mounted between the negative terminal 22 and the negative electrode current collecting tab 41 to electrically connect them to each other. The negative terminal connecting member 26 is inserted into a hole formed in the negative terminal 22. The top of the negative terminal connecting member 26 is welded and fixed to the negative terminal 22, and the bottom thereof is welded and fixed to the negative electrode current collecting tab 41.

In addition, a gasket 65 for sealing is inserted in the hole through which the negative terminal connecting member 26 penetrates the cap plate 31, and is between the negative terminal connecting member 26 and the cap plate 31. The bottom of the negative terminal connecting member 26 is inserted into a lower insulating member 45, which is mounted beneath the cap plate 31, and insulates the negative terminal connecting member 26 and the negative electrode current collecting tab 41 from the cap plate 31.

Furthermore, an upper insulating member 62 is mounted on the cap plate 31 and is beneath the negative terminal 22 to electrically insulate them from each other. The negative terminal connecting member 26 is inserted into the upper insulating member 62.

The separator 13, in some embodiments, is the same as described above, but it is not limited thereto.

The positive electrode 11 may include a positive current collector and a positive active material layer on the positive current collector.

In another embodiment, the positive electrode 11 includes a positive electrode coating portion 11a, a region with the positive active material layer coated on a current collector, and a positive electrode side end uncoated region 11b, a region without the positive active material layer coated on the current collector. The positive electrode side end uncoated region 11b is on a portion of each of the longitudinal opposite surfaces of the positive electrode current collector, so portions of both sides of the positive electrode current collector are exposed at the positive electrode side end uncoated region 11b. The positive electrode side end uncoated region 11b is formed to continue along one side end of the positive electrode 11 in the longitudinal direction of the positive electrode 11. In one embodiment, the negative electrode 12 includes a negative electrode coating portion 12a and a negative electrode side end uncoated region 12b.

The positive active material layer may include a positive active material, a binder, and optionally, a conductive material.

The positive current collector may be Al (aluminum) but it is not limited thereto.

The positive active material includes lithiated intercalation compounds that reversibly intercalate and deintercalate lithium ions. The positive active material may include a composite oxide including lithium and at least one selected from cobalt, manganese, and nickel. In some embodiments, the following compounds may be used, but the positive active material is not limited thereto:
$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, and 0≤c≤0.05); $LiE_{2-b}B_bO_{4-c}D_c$ (0≤b≤0.5 and 0≤c≤0.05); $Li_aNi_{1-b-c}Co_bB_cD_\alpha$ (0.90≤a≤1.8, 0≤b≤0.5, 0≤c≤0.05, and 0<α≤2); $Li_aNi_{1-b-c}Co_bB_cO_{2-\alpha}F_\alpha$ (0.90≤a≤1.8, 0≤b≤0.5, 0≤c≤0.05, and 0<α<2); $Li_aNi_{1-b-c}Co_bB_cO_{2-\alpha}F_2$ (0.90≤a≤1.8, 0≤b≤0.5, 0≤c≤0.05, and 0<α<2); $Li_aNi_{1-b-c}Mn_bB_cD_\alpha$ (0.90≤a≤1.8, 0≤b≤0.5, 0≤c≤0.05, and 0<α≤2); $Li_aNi_{1-b-c}Mn_bB_cO_{2-\alpha}F_\alpha$ (0.90≤a≤1.8, 0≤b≤0.5, 0≤c≤0.05, and 0<α<2); $Li_aNi_{1-b-c}Mn_bB_cO_{2-\alpha}F_2$ (0.90≤a≤1.8, 0≤b≤0.5, 0≤c≤0.05, and 0<α<2); $Li_aNi_bE_cG_dO_2$ (0.90≤a≤1.8, 0≤b≤0.9, 0≤c≤0.5, and 0.001≤d≤0.1); $Li_aNi_bCo_cMn_dG_eO_2$ (0.90≤a≤1.8, 0≤b≤0.9, 0≤c≤0.5, 0≤d≤0.5, and 0.001≤e≤0.1); $Li_aNiG_bO_2$ (0.90≤a≤1.8 and 0.001≤b≤0.1); $Li_aCoG_bO_2$ (0.90≤a≤1.8 and 0.001≤b≤0.1); $Li_aMnG_bO_2$ (0.90≤a≤1.8 and 0.001≤b≤0.1); $Li_aMn_2G_bO_4$ (0.90≤a≤1.8 and 0.001≤b≤0.1); $QO_2$; $QS_2$; $LiQS_2$; $V_2O_5$; $LiV_2O_5$; $LiO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In some embodiments, the positive active material is $LiMn_2O_4$, $LiMnO_2$, $LiNiO_2$, $LiV_2O_2$, and/or the like.

The positive active material may include the positive active material coated with a coating layer, or a combination of the active material and the active material coated with the coating layer. The coating layer may include at least one coating element compound selected from an oxide of the coating element, a hydroxide of the coating element, an oxyhydroxide of the coating element, an oxycarbonate of the coating element, or a hydroxycarbonate of the coating element. The compound for the coating layer may be either amorphous or crystalline. The coating element included in the coating layer may be Mg, Al, Co, K, Na, Ca, Si, Ti, V, Sn, Ge, Ga, B, As, Zr, or a mixture thereof. The coating may be made by any conventional process as long as it does not cause any side effects on the properties of the positive active material (the coating process may be, e.g., spray coating, immersing, or the like), which is known to those having ordinary skill in this art, so a detailed description thereof is omitted.

The binder improves binding properties of the positive active material particles to each other and to a current collector. Examples of the binder include polyvinylalcohol, carboxylmethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the binder is not limited thereto.

The conductive material improves electrical conductivity of a positive electrode. Any electrically conductive material can be used as a conductive agent unless it causes a chemical change. Examples of the conductive material include a carbon material such as natural graphite, artificial graphite, carbon black, acetylene black, ketjen black, a carbon fiber, and/or the like; a metal powder or a metal fiber of copper, nickel, aluminum, silver, and/or the like; and/or a polyphenylene derivative, and the conductive material may be used singularly or as a mixture.

The negative electrode 12 includes a negative current collector and a negative active material layer disposed thereon.

The negative current collector may be a copper foil.

The negative active material layer may include a negative active material, a binder, and optionally, a conductive material.

The negative active material includes a material that reversibly intercalates/deintercalates lithium ions, a lithium metal, a lithium metal alloy, a material being capable of doping/dedoping lithium, and/or a transition metal oxide.

The material that can reversibly intercalate/deintercalate lithium ions includes a carbon material. The carbon material may be any generally-used carbon-based negative active material in a lithium ion rechargeable battery. Examples of the carbon material include crystalline carbon, amorphous carbon, and mixtures thereof. The crystalline carbon may be non-shaped, or sheet, flake, spherical, or fiber shaped natural graphite or artificial graphite. The amorphous carbon may be a soft carbon, a hard carbon, a mesophase pitch carbonization product, fired coke, and/or the like.

Examples of the lithium metal alloy include lithium and a metal selected from Na, K, Rb, Cs, Fr, Be, Mg, Ca, Sr, Si, Sb, Pb, In, Zn, Ba, Ra, Ge, Al, and Sn.

The material being capable of doping/dedoping lithium may include Si, $SiO_x$ (0<x<2), a Si—C composite, a Si—Y alloy (wherein Y is not Si and is selected from an alkali metal, an alkaline-earth metal, a Group 13 to Group 16 element, a transition element, a rare earth element, or a combination thereof), Sn, $SnO_2$, a Sn—C composite, a Sn—Y alloy (wherein Y is not Sn and is selected from an alkali metal, an alkaline-earth metal, a Group 13 to Group 16 element, a transition element, a rare earth element, or a combination thereof), or the like. At least one of these materials may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The transition metal oxide may include vanadium oxide, lithium vanadium oxide, and/or the like.

The binder improves binding properties of negative active material particles with one another and with a current collector. Examples of the binder include polyvinylalcohol, carboxylmethylcellulose, hydroxypropylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but the binder is not limited thereto.

The conductive material is included to improve electrode conductivity. Any electrically conductive material may be used as a conductive material unless it causes a chemical change. Examples of the conductive material include carbon-based materials such as natural graphite, artificial graphite, carbon black, acetylene black, ketjen black, carbon fibers, and/or the like; metal-based materials of metal powder or metal fiber including copper, nickel, aluminum, silver, and/or the like; conductive polymers such as polyphenylene derivatives; or a mixture thereof.

Each of the negative electrode and the positive electrode may be fabricated by a method including mixing an active material, a conductive material, and a binder into an active material composition and coating the composition on a current collector. Electrode manufacturing methods are well known, and thus they are not described in detail in the present specification. The solvent may be N-methylpyrrolidone, but it is not limited thereto.

Hereinafter, embodiments of the invention are illustrated in more detail with reference to examples. However, the following are exemplary embodiments and are not intended to be limiting.

Furthermore, other aspects of batteries that are not described herein can be sufficiently understood by those of ordinary skill in the art, and thus they may not be illustrated here.

Fabrication of Rechargeable Lithium Battery Cell

Example 1

25 wt % of a copolymer of polyvinylidenefluoride and hexafluoropropylene (PVdF-HFP) (containing 5 wt % of HFP) was added with 75 wt % of an electrolyte solution at 60° C. The electrolyte solution was a 1 M $LiClO_4$ electrolyte solution prepared with a mixture of propylenecarbonate (PC) and ethylenecarbonate (EC) in a volume ratio of 1:1, and 60 parts by weight of acetone based on 100 parts by weight of the total weight of the PVdF-HFP and the electrolyte solution at 60° C. The electrolyte solution was mixed with the PVdF-HFP at 3° C. for 3 hours. Then, a polyvinylidenefluoride film (Millipore Co.) was dipped in the mixture, and the acetone therein was evaporated for 20 minutes, fabricating a dual-phase separator.

As for a positive electrode, a positive active material layer composition was prepared by mixing $LiMn_2O_4$ as a positive active material, polyvinylidenefluoride (PVdF) as a binder, and carbon as a conductive material in a weight ratio of 92:4:4 and dispersing the mixture into N-methyl-2-pyrrolidone. Then, the positive active material layer composition was coated, dried, and compressed on a 12 µm-thick aluminum foil.

The separator and the positive electrode were used with a lithium metal counter electrode to fabricate a half-cell.

Example 2

A half-cell was fabricated according to the same method as Example 1 except that a copolymer of polyvinylidenefluoride and hexafluoropropylene (PVdF-HFP) (containing 8 wt % of HFP) was used instead of a copolymer of polyvinylidenefluoride and hexafluoropropylene (PVdF-HFP) (containing 5 wt % of HFP).

Example 3

A half-cell was fabricated according to the same method as Example 1 except that a copolymer of polyvinylidenefluoride and hexafluoropropylene (PVdF-HFP) (containing 12 wt % of HFP) was used instead of a copolymer of polyvinylidenefluoride and hexafluoropropylene (PVdF-HFP) (containing 5 wt % of HFP).

Example 4

A half-cell was fabricated according to the same method as Example 1 except that a copolymer of polyvinylidenefluoride and hexafluoropropylene (PVdF-HFP) (containing 15 wt % of HFP) was used instead of a copolymer of polyvinylidenefluoride and hexafluoropropylene (PVdF-HFP) (containing 5 wt % of HFP).

Comparative Example 1

A half-cell was fabricated according to the same method as Example 1 except that a single-phase separator was fabricated by dipping a polyvinylidenefluoride layer (Millipore Co.) in an electrolyte solution. The electrolyte solution was a 1 M $LiClO_4$ electrolyte solution containing a mixture of propylenecarbonate (PC) and ethylenecarbonate (EC) in a volume ratio of 1:1.

Comparative Example 2

A half-cell was fabricated according to the same method as Example 1 except that the copolymer of polyvinylidenefluoride and hexafluoropropylene contained 12 wt % of HFP and had a weight average molecular weight of 400,000 g/mol. In addition, the electrolyte solution was a 1M $LiClO_4$ electrolyte solution containing a mixture of propylenecarbonate (PC) and ethylenecarbonate (EC) in a volume ratio of 1:1, and 60 parts by weight of acetone based on 100 parts by weight of the total weight of the PVdF-HFP and the electrolyte solution. The PVdF-HFP and the electrolyte solution were mixed at 3° C. for 3 hours. Then, the acetone therein was evaporated for 20 minutes to fabricate a single-phase separator.

Evaluation 1: Scanning Electronic Microscope (SEM) Photograph Analysis of Separator FIGS. 3 and 4 respectively provide the scanning electronic microscope (SEM) photographs of the separators according to Example 3 and Comparative Example 1.

Figure 3:
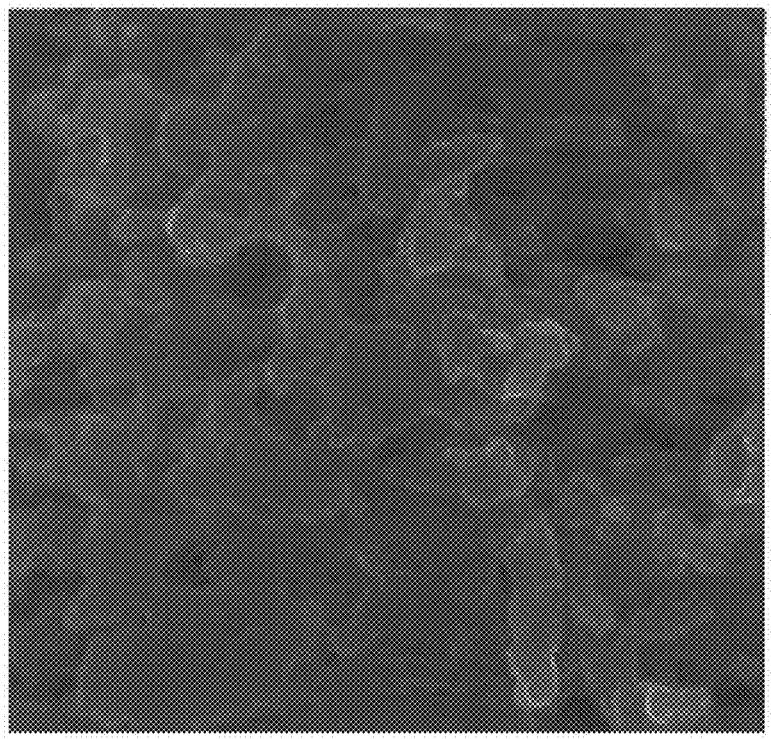
FIG. 3 and FIG. 4 are scanning electron microscope (SEM) photographs of the separators for a rechargeable lithium battery according to Example 3 and Comparative Example 1, respectively.
Figure 4:
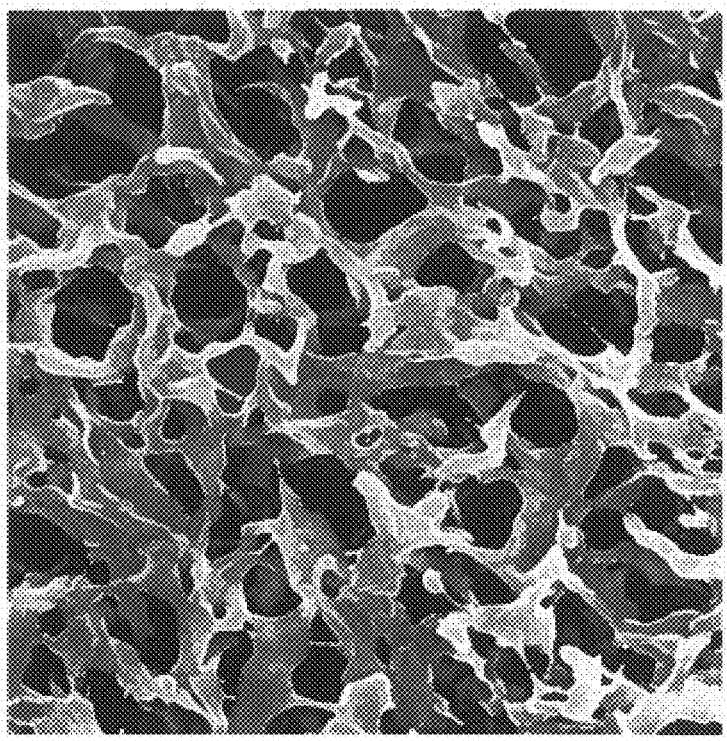

Referring to FIGS. 3 and 4, the separator according to Example 3 had a dual-phase structure of a backbone polymer coated by or surrounded with an ion conductive polymer, while the separator according to Comparative Example 1 had a single-phase structure of a backbone polymer.

Evaluation 2: Mechanical Strength of Separator

The separators according to Examples 1 to 4 and Comparative Examples 1 and 2 were measured regarding mechanical strength using a tensile strength meter. The results are provided in the following Table 1.

Evaluation 3: Ion Conductivity of Separator

The separators according to Examples 1 to 4 and Comparative Examples 1 and 2 were measured regarding ionic conductivity in a 4 probe method using impedance equipment at 30° C. The results are provided in the following Table 1.

TABLE 1

|  | Mechanical strength (Mpa) | Ionic conductivity (S/cm) |
|---|---|---|
| Example 1 | 1.88 | $0.71 \times 10^{-3}$ |
| Example 2 | 1.83 | $1.14 \times 10^{-3}$ |
| Example 3 | 1.78 | $1.70 \times 10^{-3}$ |
| Example 4 | 1.68 | $2.12 \times 10^{-3}$ |
| Comparative Example 1 | 1.91 | $0.14 \times 10^{-3}$ |
| Comparative Example 2 | 1.42 | $1.73 \times 10^{-3}$ |

Referring to Table 1, the separators having a dual-phase structure of a backbone polymer coated with an electrolyte solution according to Examples 1 to 4, all had good mechanical strength and good ion conductivity compared with the one having a single phase structure of a backbone polymer according to Comparative Example 1 and the one having a single phase structure of ionic conductivity according to Comparative Example 2.

The separator according to Comparative Example 1 had high mechanical strength, but low ionic conductivity, and the separator according to Comparative Example 2 had high ionic conductivity, but low mechanical strength.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and equivalents thereof.

What is claimed is:

1. A separator for a rechargeable lithium battery comprising:
   a backbone polymer; and
   a coating layer consisting of an ion conductive polymer and an electrolyte solution, the coating layer surrounding the backbone polymer,
   wherein:
      the backbone polymer comprises polyvinylidenefluoride (PVdF);
      the ion conductive polymer consists of a copolymer of polyvinylidenefluoride and hexafluoropropylene (PVdF-HFP) or the copolymer of polyvinylidenefluoride and hexafluoropropylene (PVdF-HFP) and at least one selected from the group consisting of polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC);
      the backbone polymer is included in an amount of about 5 wt % to about 70 wt % based on a total weight of the separator;
      the ion conductive polymer is included in an amount of about 5 wt % to about 70 wt % based on the total weight of the separator; and
      the ion conductive polymer and the electrolyte solution are included in a weight ratio of 1:2 to 1:6.

2. The separator for a rechargeable lithium battery of claim 1, wherein the backbone polymer further comprises at least one selected from the group consisting of polytetrafluoroethylene (PTFE), polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC).

3. The separator for a rechargeable lithium battery of claim 1, wherein the ion conductive polymer is a gel-type polymer.

4. The separator for a rechargeable lithium battery of claim 1, wherein the copolymer of polyvinylidenefluoride and hexafluoropropylene (PVdF-HFP) comprises hexafluoropropylene (HFP) in an amount of about 2 to about 70 wt % based on a total weight of the copolymer of polyvinylidenefluoride and hexafluoropropylene (PVdF-HFP).

5. The separator for a rechargeable lithium battery of claim 1, wherein the copolymer of polyvinylidenefluoride and hexafluoropropylene (PVdF-HFP) comprises the hexafluoropropylene (HFP) in an amount of about 5 to about 15 wt % based on a total weight of the copolymer of polyvinylidenefluoride and hexafluoropropylene (PVdF-HFP).

6. The separator for a rechargeable lithium battery of claim 1, wherein the electrolyte solution comprises a lithium salt and a non-aqueous organic solvent.

7. The separator for a rechargeable lithium battery of claim 6, wherein the lithium salt comprises $LiClO_4$, and the non-aqueous organic solvent comprises a mixture of propylenecarbonate (PC) and ethylenecarbonate (EC).

8. The separator for a rechargeable lithium battery of claim 1, wherein the electrolyte solution is included in an amount of about 5 wt % to about 90 wt % based on the total weight of the separator.

9. The separator for a rechargeable lithium battery of claim 1, wherein the backbone polymer comprises a film.

10. The separator for a rechargeable lithium battery of claim 1, wherein the backbone polymer further comprises at least one selected from the group consisting of polytetrafluoroethylene (PTFE), polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC), and the ion conductive polymer consists of the copolymer of polyvinylidenefluoride and hexafluoropropylene (PVdF-HFP) and the at least one selected from the group consisting of polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC).

11. The separator for a rechargeable lithium battery of claim 1, wherein the ion conductive polymer surrounds top and bottom surfaces and side surfaces of the backbone polymer.

12. A separator for a rechargeable lithium battery comprising:
a backbone polymer; and
a coating layer consisting of an ion conductive polymer and an electrolyte solution, the coating layer surrounding the backbone polymer,
wherein:
the backbone polymer comprises polyvinylidenefluoride (PVdF);
the ion conductive polymer consists of a copolymer of polyvinylidenefluoride and hexafluoropropylene (PVdF-HFP) or the copolymer of polyvinylidenefluoride and hexafluoropropylene (PVdF-HFP) and at least one selected from the group consisting of polyethylene (PE), polypropylene (PP), polyolefin, polyethyleneoxide (PEO), polypropyleneoxide (PPO), polyacrylonitrile (PAN), polymethylmethacrylate (PMMA), and polyvinylchloride (PVC);
a weight ratio of the ion conductive polymer to the backbone polymer in the separator is from 5/90 to 90/5;
a weight ratio of the ion conductive polymer to the electrolyte solution is from 1/6 to 1/2;
the backbone polymer is included in an amount of about 5 wt % to about 70 wt % based on a total weight of the separator; and
the ion conductive polymer is included in an amount of about 5 wt % to about 70 wt % based on the total weight of the separator.

* * * * *